UNITED STATES PATENT OFFICE.

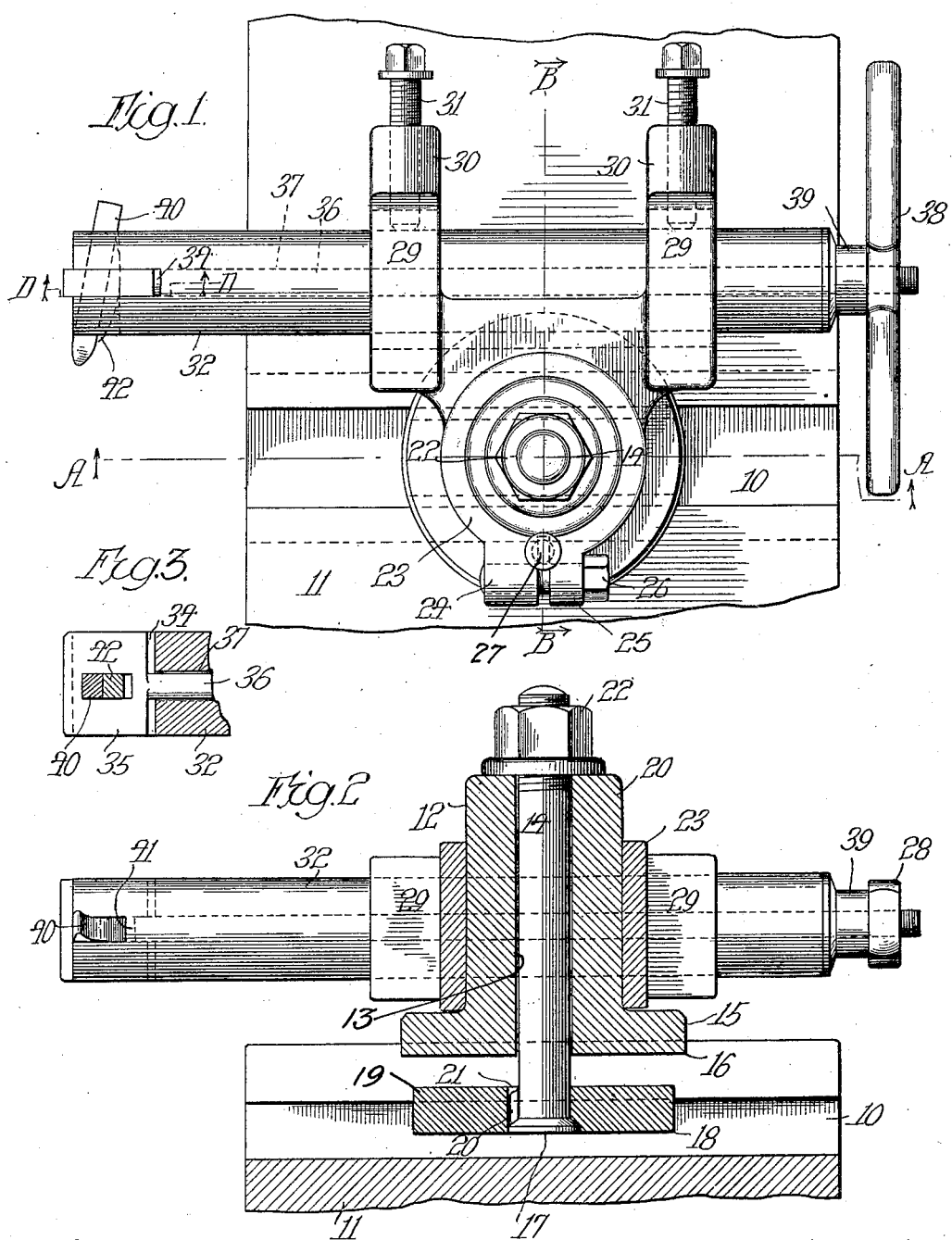

JOHN PRINCE, OF CHICAGO, ILLINOIS.

TOOL-HOLDER.

No. 903,501.　　　　Specification of Letters Patent.　　　Patented Nov. 10, 1908.

Application filed February 26, 1906. Serial No. 302,859.

*To all whom it may concern:*

Be it known that I, JOHN PRINCE, a citizen of the United States, and resident of Chicago, in the county of Cook and State of Illinois, have invented certain new and useful Improvements in Tool-Holders, of which the following is a specification.

My invention is concerned with a novel tool holder for lathes and similar machine tools, and is designed to produce a holder by which a boring tool can be held at any desired angle to the work, instead of being held necessarily at right angles thereto, as is the practice at present.
Other objects of my invention will be apparent from the specification, and the novel features and combinations will be specifically pointed out in the claims.

To illustrate my invention, I annex hereto two sheets of drawings, in which the same reference characters are used to designate identical parts in all the figures, of which,—

Figure 1 is a top plan view of my invention for holding boring tools; Fig. 2 is a side elevation of the same, in vertical section on the line A—A of Fig. 1; and Fig. 3 is a detail, in section on the line D—D of Fig. 1.

My improved tool holder is intended to be used in connection with any engine lathe, or machine tool of the same general class, and is adapted to be adjustably secured in the inverted T-shaped slot 10, which is customarily employed in the cross slide 11, or other portion of the machine upon which the tool is supported.

I will describe my novel boring tool holder in connection with a preferred form of post 12, which will be seen to consist of a cylinder having the central aperture 13 extending therethrough and adapted to receive the clamping bolt 14. The tool post is also provided with the disk-shaped base 15, which rests upon the top of the cross slide over the slot 10. A rib 16 is provided on the under side of the base 15, and is adapted to extend down into the slot 10, and is as narrow as the width of the top of the smallest sized inverted T-slot 10 that is ordinarily met with in lathe construction, it being well known that these slots vary in sizes in different lathes and machine tools. The clamping bolt 14 has the head 17, which is preferably countersunk in a correspondingly shaped recess in the under side of the clamping bar 18, which is adapted to be placed in the inverted T-slot 10, and has the same general shape in cross section, although, of course, its dimensions are smaller. The rib 19 on the upper surface thereof, which is opposed to and corresponds with the rib 16 on the bottom of the tool post, is slightly narrower than the width of the portion of the smallest sized slot 10 with which it is adapted to coöperate, and the width of the main clamping bar is likewise slightly narrower than the width of the corresponding portion of the smallest sized slot 10 with which it is adapted to coöperate, and it will be readily apparent that by turning the ribs 16 and 19 to an angle with the slots 10, so that two of their corners will contact with the sides, the tool post can be clamped just as securely as if the parts were an exact fit, it being, of course, understood that they will be set so that the stress on the tool will tend to keep them in their angular position, instead of to throw them toward the parallel position.

The portion of the clamping bolt 14 next to the head 17 is provided with a rib or lug 20, which coöperates with a correspondingly shaped slot 21 in the clamping bar 18, as seen in Fig. 2, so as to prevent the clamping bolt 14 from turning when its nut 22 is screwed down to clamp the post securely in position. Coöperating with the post 20 is the clamping member, such as a ring 23, which is preferably split on one side, and has the lugs 24 and 25 provided with suitable apertures, the aperture in 24 being threaded, to receive the set screw or clamp screws 26 by which the ring is securely clamped upon the post at any desired angle. To conveniently adjust the height of the ring upon the post, so that the height of the tool can be readily varied without changing the angle of its rake, I preferably provide the adjusting screw bolt 27, which preferably has the milled head by which it is operated, and the lower portion thereof is threaded and coöperates with threads cut in the opposed surfaces of the lugs 24 and 25 in a manner that will be readily understood. The lower end of the adjusting screw bolt 27 rests upon the base 15 of the post, so that by turning the screw, the clamping ring will be raised upon the post.

Where the tool holder is designed especially to hold my novel boring tools, the ring is provided with the pair of yokes 29, which have the stationary nut portions 30 to receive the set screws 31 by which the cylinder 32 is securely clamped against the V-shaped bearing surfaces of the yokes. The cylinder 32 has the elongated recess 34 in the end thereof to receive the head 35 of the yoke rod 36, which extends through the central bore 37 extending the length of the cylinder 32. The other end of the yoke rod is threaded, and a lever nut 38 coöperating therewith, acts upon the end of the cylinder, preferably through the medium of the washer 39, to draw the head or yoke 35 into the elongated slot 34 so as to clamp the bearing tool 40 against the bottom of the shallower transverse slot 41 formed in the end of the cylinder 32 at right angles to the slot 34. A rocker 42 is preferably interposed between the tool 40 and the bottom of the slot 41, so that by changing its position, the angle of the tool relative to the work can be changed as desired, and, so far as I am aware, this is a novel mechanism for mounting boring tools, as the practice has heretofore been to set them only at a single invariable angle to the work, whereas by my improvements, it will be seen that the angle can be varied as much as is necessary to produce the best effect in the action of the tool. By loosening the lever nut 38, the tool can be readily set at any angle, and by tightening the nut 38, it can be quickly and firmly secured in the desired adjustment.

While I have shown and described my invention as embodied in the form which I at present consider best adapted to carry out its purposes, it will be understood that it is capable of modifications, and that I do not desire to be limited in the interpretation of the following claims except as may be necessitated by the state of the prior art.

What I claim as new, and desire to secure by Letters Patent of the United States, is,—

1. In a boring tool, the combination with the supporting sleeve having the elongated recess across the end thereof and the shorter transverse recess across the same end, of the rod extending through the sleeve provided with the slotted head adapted to slide in the elongated recess, the rocker and the tool adapted to pass through the shorter recess and the slot in the head, and means for drawing up and securing the rod to clamp the parts together.

2. In a device of the class described, the combination with a longitudinally-apertured cylinder having radial recesses in one end thereof at right angles to each other, a yoke rod extending therethrough having an aperture in the head thereof, a nut adapted to coöperate with the threaded end thereof, and a rocker adapted with a boring tool to pass through the yoke and be drawn against the bottom of one of the recesses.

3. In a device of the class described, the combination with a longitudinally-apertured cylinder having a pair of radial recesses at one end thereof at right angles to each other, one recess being deeper than the other, a yoke rod having an aperture in one end extending through the cylinder, a nut coöperating with the threaded end of the yoke rod, the enlarged apertured end being adapted to fit in the deeper recess in the end of the cylinder, and a rocker adapted with a boring tool to pass through the yoke and be drawn against the bottom of the shallower recess.

In witness whereof, I have hereunto set my hand and affixed my seal, this 17th day of February, 1906.

JOHN PRINCE. [L. S.]

In presence of—
 JOHN H. McELROY,
 HARVEY L. HOPKINS.